US011711569B2

(12) United States Patent
Bordes et al.

(10) Patent No.: US 11,711,569 B2
(45) Date of Patent: Jul. 25, 2023

(54) METHOD AND DEVICE FOR ADAPTING THE VIDEO CONTENT DECODED FROM ELEMENTARY STREAMS TO THE CHARACTERISTICS OF A DISPLAY

(71) Applicant: INTERDIGITAL VC HOLDINGS, INC., Wilmington, DE (US)

(72) Inventors: Philippe Bordes, Laille (FR); Pierre Andrivon, Liffre (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/774,785

(22) PCT Filed: Nov. 4, 2016

(86) PCT No.: PCT/EP2016/076707
§ 371 (c)(1),
(2) Date: May 9, 2018

(87) PCT Pub. No.: WO2017/080927
PCT Pub. Date: May 18, 2017

(65) Prior Publication Data
US 2018/0324481 A1   Nov. 8, 2018

(30) Foreign Application Priority Data
Nov. 9, 2015   (EP) ..................................... 15306777

(51) Int. Cl.
H04N 21/43   (2011.01)
H04N 21/81   (2011.01)
(Continued)

(52) U.S. Cl.
CPC ......... *H04N 21/43* (2013.01); *H04N 21/2353* (2013.01); *H04N 21/4345* (2013.01); *H04N 21/8193* (2013.01)

(58) Field of Classification Search
None
See application file for complete search history.

(56) References Cited

U.S. PATENT DOCUMENTS 5,943,029 A * 8/1999 Ross .......................... G06F 3/14
345/11
8,010,692 B1   8/2011 Shanson
(Continued)

FOREIGN PATENT DOCUMENTS

CN   101810007 A   8/2010
CN   104604242 A   5/2015
(Continued)

OTHER PUBLICATIONS

Anonymous, "Mastering Display Color Volume Metadata Supporting High Luminance and Wide Color Gamut Images", Society of Motion Picture Television Engineers (SMPTE) Standard, SMPTE ST 2086:2014, Oct. 13, 2014, pp. 1-6.
(Continued)

*Primary Examiner* — An Son P Huynh (57) ABSTRACT

The present disclosure relates to a method and device for adapting a video content decoded from elementary streams to the characteristics of a display from at least one type of metadata giving information regarding said elementary streams. Such a method comprises:—obtaining (102) an additional information (HDR DESCR.) indicating the presence of one particular type of metadata;—determining if said video content decoded from elementary streams is display-able on said display (11) from said additional information (HDR DESCR.) and the characteristics of the display (EDID); and—if said video content decoded from elemen-
(Continued)

tary streams is determined as being displayable, selecting (105) a process from said additional information and the characteristics of the display and adapting (106) the video content according to the selected process.

15 Claims, 3 Drawing Sheets

(51) Int. Cl.
  *H04N 21/434* (2011.01)
  *H04N 21/235* (2011.01)

(56) References Cited

U.S. PATENT DOCUMENTS

| | | | |
|---|---|---|---|
| 8,091,112 B1* | 1/2012 | Elliott | H04N 21/2668 725/135 |
| 8,135,230 B2 | 3/2012 | Rempel et al. | |
| 8,334,857 B1* | 12/2012 | Ogrinc | G09G 5/377 345/204 |
| 9,565,476 B2* | 2/2017 | Bakke | H04N 21/84 |
| 9,648,317 B2 | 5/2017 | Wang | |
| 9,876,616 B2* | 1/2018 | Tsukagoshi | H04L 5/0044 |
| 9,992,553 B2* | 6/2018 | Bennett | H04N 21/812 |
| 10,142,382 B1* | 11/2018 | Arini | H04L 65/1076 |
| 10,708,647 B2* | 7/2020 | Yoshizawa | H04N 21/4312 |
| 2002/0157112 A1* | 10/2002 | Kuhn | H04N 21/234336 725/113 |
| 2004/0264931 A1* | 12/2004 | Nakashika | G11B 27/034 386/240 |
| 2007/0055698 A1* | 3/2007 | McCoy | G06Q 50/08 |
| 2007/0097257 A1 | 5/2007 | El-Maleh | |
| 2008/0126591 A1 | 5/2008 | Kwon | |
| 2008/0204481 A1* | 8/2008 | Mostinski | G09G 3/3406 345/690 |
| 2009/0087110 A1 | 4/2009 | Tourapis | |
| 2010/0185362 A1 | 7/2010 | Vialatte et al. | |
| 2011/0119396 A1* | 5/2011 | Kwon | H04N 21/2353 709/231 |
| 2011/0267385 A1* | 11/2011 | Ninan | H04L 12/42 345/102 |
| 2011/0292981 A1* | 12/2011 | Kihara | H04N 17/004 375/224 |
| 2011/0310981 A1* | 12/2011 | Narasimhan | H04N 19/467 375/240.26 |
| 2012/0013746 A1 | 1/2012 | Chen | |
| 2012/0140769 A1* | 6/2012 | Hwang | H04L 69/22 370/389 |
| 2012/0170596 A1* | 7/2012 | Hwang | H04L 65/608 370/471 |
| 2013/0033477 A1* | 2/2013 | Sirpal | G06F 1/1616 345/211 |
| 2013/0036235 A1* | 2/2013 | Lopez Garcia | H04L 65/602 709/231 |
| 2013/0067520 A1* | 3/2013 | Corl | H04N 21/431 725/54 |
| 2013/0195204 A1* | 8/2013 | Reznik | H04L 65/80 375/240.26 |
| 2013/0238758 A1* | 9/2013 | Lee | H04N 21/44016 709/218 |
| 2013/0293596 A1 | 11/2013 | Atkins | |
| 2013/0342762 A1 | 12/2013 | Wang | |
| 2014/0125696 A1 | 5/2014 | Newton | |
| 2014/0146877 A1 | 5/2014 | Delegue | |
| 2014/0210847 A1 | 7/2014 | Knibbeler | |
| 2014/0245227 A1* | 8/2014 | Xu | G06F 11/3058 715/835 |
| 2015/0042890 A1* | 2/2015 | Messmer | H04N 5/20 348/725 |
| 2015/0071615 A1* | 3/2015 | Messmer | H04N 13/128 386/278 |
| 2015/0156469 A1 | 6/2015 | Qu | |
| 2015/0172690 A1 | 6/2015 | Tsukagoshi | |
| 2015/0208024 A1 | 7/2015 | Takahashi et al. | |
| 2015/0208102 A1* | 7/2015 | Takahashi | H04N 21/4854 348/441 |
| 2015/0302819 A1* | 10/2015 | Weksler | H04N 21/4854 345/611 |
| 2015/0302894 A1 | 10/2015 | Boiman | |
| 2015/0339994 A1* | 11/2015 | Verbeure | G09G 3/3614 345/214 |
| 2015/0341611 A1* | 11/2015 | Oh | H04N 9/8722 386/230 |
| 2015/0371613 A1* | 12/2015 | Patel | G06F 21/10 345/549 |
| 2016/0044277 A1* | 2/2016 | Oh | H04N 7/0117 386/230 |
| 2016/0073155 A1* | 3/2016 | Subramaniam | H04N 21/4316 725/32 |
| 2016/0080714 A1* | 3/2016 | Tsukagoshi | H04N 19/85 348/453 |
| 2016/0093239 A1* | 3/2016 | Wang | G06F 1/32 345/55 |
| 2016/0100183 A1 | 4/2016 | Yamamoto | |
| 2016/0142695 A1 | 5/2016 | Uchimura et al. | |
| 2016/0142746 A1* | 5/2016 | Schuberth | H04N 21/2146 725/31 |
| 2016/0173811 A1* | 6/2016 | Oh | H04N 7/015 725/116 |
| 2016/0203618 A1* | 7/2016 | Li | H04N 21/00 345/591 |
| 2016/0286226 A1* | 9/2016 | Ridge | H04N 19/34 |
| 2016/0286241 A1* | 9/2016 | Ridge | H04N 19/186 |
| 2017/0085889 A1* | 3/2017 | Bayion | H04N 19/44 |
| 2017/0085897 A1* | 3/2017 | Narasimhan | H04N 19/186 |
| 2017/0105042 A1* | 4/2017 | Toma | G11B 27/105 |
| 2017/0127126 A1* | 5/2017 | Strein | H04N 21/44 |
| 2017/0264859 A1* | 9/2017 | Drugeon | H05B 47/11 |
| 2017/0279530 A1* | 9/2017 | Tsukagoshi | G02B 6/4246 |
| 2017/0339418 A1* | 11/2017 | Ramasubramonian | H04N 19/136 |
| 2017/0374313 A1* | 12/2017 | Oh | H04N 7/015 |
| 2018/0077453 A1* | 3/2018 | Oh | H04N 21/2353 |
| 2018/0115761 A1* | 4/2018 | Shimada | H04N 5/76 |
| 2018/0255225 A1* | 9/2018 | Yu | G09G 5/10 |
| 2018/0278963 A1* | 9/2018 | Schueuer | H04N 19/65 |
| 2018/0278967 A1* | 9/2018 | Kerofsky | H04N 19/186 |
| 2018/0295318 A1* | 10/2018 | Tsukagoshi | H04L 65/607 |
| 2018/0302663 A1* | 10/2018 | Yoshizawa | H04N 21/4402 |
| 2018/0324481 A1* | 11/2018 | Bordes | H04N 21/8193 |

FOREIGN PATENT DOCUMENTS

| | | | |
|---|---|---|---|
| CN | 105009567 A | 10/2015 | |
| CN | 105009580 A | 10/2015 | |
| CN | 105284105 A | 1/2016 | |
| CN | 105409225 A | 3/2016 | |
| EP | 2543193 A1 | 1/2013 | |
| JP | 2011119828 A | 6/2011 | |
| JP | 2014528182 A | 10/2014 | |
| JP | 2015008361 A | 1/2015 | |
| JP | 6921815 B2 | 8/2021 | |
| KR | 20080067360 | 7/2008 | |
| KR | 20120057027 | 6/2012 | |
| KR | 20130053444 | 5/2013 | |
| KR | 20140006102 A | 1/2014 | |
| KR | 20140117658 A | 10/2014 | |
| RU | 2433477 C1 | 11/2011 | |
| TW | 201537970 A | 10/2015 | |
| WO | 2006034464 A1 | 3/2006 | |
| WO | WO-2012060581 A2 * | 5/2012 | ....... H04N 21/44016 |
| WO | 2014178286 A1 | 11/2014 | |
| WO | 201500791 | 1/2015 | |
| WO | WO 2015007910 A1 | 1/2015 | |

OTHER PUBLICATIONS

Anonymous, "HDR Static Metadata Extensions", Consumer Electronic Standard, CEA-861.3, Jan. 2015, pp. 1-8.

(56) References Cited

OTHER PUBLICATIONS

Anonymous, "Digital Video Broadcasting (DVB); Specification for service information (SI) in DVB systems", European Telecommunications Standards Institute, European Standard ETSI EN 300 468 V1.14.1, May 2014, pp. 1-158.
Anonymous, "High Efficiency Video Coding", ITU-T H.265, Telecommunication Standardization Sector of ITU, Series H: Audiovisual and Multimedia Systems, Infrastructure of audiovisual services—Coding of moving video, Apr. 2015, pp. 1-634.
Anonymous, "Transmission of Non-Telephone Signals", ITU-T H.222, Telecommunication Standardization Sector of ITU, Information Technology—Generic Coding of Moving Pictures and Associated Audio Information Systems, Jul. 1995, pp. 1-135.
Naccari et al., "High dynamic range compatibility information SEI message", Joint Collaborative Team on Video Coding (JCT-VC) of ITU-T SG 16 WP 3 and ISO/IEC JTC 1/SC 29/WG 11, Document JCTVC-U0033, 21st Meeting, Warsaw, Poland, Jun. 19, 2015, pp. 1-9.
Anonymous, "6.2.33 Service Descriptor, Annex I", Digital Video Broadcasting Standard, Geneva, Switzerland, May 2, 2014, pp. 1-8.
Minoo et al., "Exploratory Test Model for HDR extension of HEVC", International Organization for Standardization, ISO/IEC JTC1/SC29/WG11, Coding of Moving Pictures and Audio, ISO/IEC JTC1/SC29/WG11 MPEG2014/N15792, Geneva, Switzerland, Oct. 2015, 5 pages.
CN105009567 A, Translated "Systems and methods for appearance mapping for compositing overlay graphics" Oct. 28, 2015.
CN105009580 A, Translated "Display management for high dynamic range video" Oct. 28, 2015.
JPJP2015008361A, Translated "Reproducing Apparatuses, Reproducing Method and Recording Medium" Jan. 15, 2015.
WO2014178286A1 Translated "Transmission Device, Transmission Method, Receiving Device, and Receiving Method" Nov. 6, 2014.
Valdés, V. et al., "Content Adaptation Capabilities Description Tool For Supporting Extensibility in the CAIN Framework." In Multimedia Content Representation, Classification and Security: International Workshop, MRCS 2006, Istanbul, Turkey, Sep. 11-13, 2006. Proceedings,. Springer Beriin Heidelberg, 2006, pp. 395-402 (8 pages).
Böszörményi, L. et al., "Metadata driven adaptation in the ADMITS project." Signal Processing: Image Communication 18, No. 8, 2003, pp. 749-766 (18 pages).
Kang, K. et al., "Metadata Broadcasting For Personalized Service: A Practical Solution." ETRI Journal vol. 26, No. 5, Oct. 2004, pp. 452-466 (15 pages).
Standard, S. M. P. T. E. "Dynamic Metadata for Color vol. Transform—Application# 3." SMPTE ST 2094-30:201x, Version 3, Oct. 2015, (13 pages).
Technical Specification, ETSI "Digital Video Broadcasting (DVB); Specification for the Use of Video and Audio Coding in Broadcasting Applications based on the MPEG-2 Transport Stream." ETSI TS 101, No. 154, V1.9.1, Sep. 2009 (163 pages).
ITU-T "Series H: Audiovisual and Multimedia Systems: Infrastructure of audiovisual services—Coding of moving video." in ITU-T, sec. H 265.2, Oct. 2014, (12 pages).

\* cited by examiner

METHOD AND DEVICE FOR ADAPTING THE VIDEO CONTENT DECODED FROM ELEMENTARY STREAMS TO THE CHARACTERISTICS OF A DISPLAY

This application is a national stage application under 35 U.S.C. § 371 of International Application PCT/EP2016/076707, filed Nov. 4, 2016, which was published in accordance with PCT Article 21(2) on May 18, 2017, in English, and which claims the benefit of European Patent Application No. 15306777.2, filed Nov. 9, 2015.

1. FIELD

The present disclosure generally relates to picture/video encoding and decoding. Particularly, but not exclusively, the technical field of the present disclosure relates to delivering a High Dynamic Range (HDR) content on displays with different capabilities.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

The capture and display of image content, whether static pictures or videos, with a dynamic range that approaches real scenes has been a long-term challenge.

Actually, human vision has wide latitude for scene brightness, and has multiple adaptation mechanisms that provide an automatic gain to the human visual system. Notably, the brightness range that people can see is much greater than the available contrast range of most currently existing displays.

In an attempt to offer display of contents meeting the requirements of human vision, High Dynamic Range (HDR) images have recently been specified and defined, which include higher peak luminance, lower minimum luminance, greater contrast range, as compared to Standard Dynamic Range (SDR) images. In other words, HDR images offer increased shadow and highlight detail over SDR images, namely brighter whites, darker blacks, and brighter colors that better match images we see in the real world.

As is well known, a picture, whether of a HDR or SDR type, may be represented by one or several arrays of samples (aka pixel values) in a specific encoding format, which specifies all information relative to these pixel values and all information which may be used by a display and/or any other device to decode and/or display this picture. The same applies for video contents. In the following, the term "image content" will be used to cover both pictures and video contents.

An image content usually comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits, which defines a maximal dynamic range of the pixel values.

It is expected that broadcasters and distributors of image contents will frequently need to convert between SDR and HDR content to support delivery to all possible outlets and devices. This may be the case, notably, for the conversion from HDR content to layered content which allows backwards compatibility with SDR distribution and display systems. It may also be the case for interoperation of HDR signals with HDR displays having less peak white capability than the source.

Displays, image processors, up/down color convertors will all need to detect the HDR encoding and colorimetry in use to correctly process and display the signal.

In order to ease such processing, some Standards Developing Organizations (SDO) have specified a set of metadata information to be associated with the HDR (High Dynamic Range) coded video streams. The purpose of these metadata is to facilitate the adaptation (e.g. HDR-to-SDR or HDR-to-HDR remapping) or the interpretation of the reconstructed HDR pictures to the current display characteristics.

Such HDR metadata mainly comprise static metadata on the one hand, and dynamic or content-dependent metadata, on the other hand, the latter being defined as metadata that can vary dynamically throughout the source content (i.e. can change per scene inside the same sequence).

They comprise, for example:

Mastering Display Color Volume information (as described for example in SMPTE Standard ST 2086:2014, "Mastering Display Color Volume Metadata Supporting High Luminance and Wide Color Gamut Images", CEA Standard "HDR Static Metadata Extensions CEA-861.3 January 2015 and ITU-T H.265 (10/2014)): such static metadata are included with mastered HDR content to convey the color volume of the mastering display and the luminance of the content. This is described by the chromaticity of the red, green and blue display primaries and white point of the mastering display, plus its black level and peak luminance level. In other words, such static metadata describe the actual HDR color volume of the mastering display used to create the image content in order to guide the content adaptation (ex: color volume remapping) towards the display characteristics.

Color Remapping Information (CRI) (as described in ITU-T H.265 (10/2014) and SMPTE Standard ST 2094-30 in ballot): a dynamic metadata represented by a parametric model function that operates a color volume remapping transformation of the HDR pictures to create SDR (represented with a standardized format) pictures. Such dynamic metadata convey frame-by-frame or scene-by-scene Color Remapping Information, which will enable color transformation to be variable along the content timeline.—Content Light Level information (as described in CEA Standard "HDR Static Metadata Extensions CEA-861.3 January 2015 and ITU-T H.265 (04/2015)): the minimum and averaged maximum luminance values to re-scale the HDR content to the HDR display capabilities (ex: power consumption).

HDR compatibility (as described in ITU-T H.265 (04/2015) and by M. Naccari, A. Cotton, S. Schwarz, M. Pindoria, M. Mrak, T. Borer (BBC), in "High dynamic range compatibility information SEI message,"): such metadata indicate that the content can be displayed on HDR or SDR displays, with an appropriate (pre-defined) post-processing.

These different HDR-related metadata types can be used by a receiver in charge of decoding the receiver encoded video content, for example the Integrated Receiver Device (IRD), to adapt the reconstructed HDR pictures to the display characteristics, for example to the display currently connected to the IRD.

Actually, when source content mastered with HDR is transformed for presentation on a display having a smaller color volume such as a SDR display, the color transformation process can be optimized through the use of these content-dependent, dynamic color transform metadata.

As the content characteristics change from scene to scene, the optimal transform processing that best reproduces the content creators' artistic intent can change. For example, the color volume transformation parameters used for a very dark scene could be quite different from those used for a very bright scene.

Hence, the transforms can be represented as metadata synchronized with the frames of one master. The metadata can be captured or generated as part of the mastering process, when images are creatively approved, and later applied in media conversions during the distribution stage.

More precisely, the IRD, which may be part of a set-top-box for example, or integrated in a TV set, may use one or combine several of these metadata to perform the adaptation of the decoded HDR pictures to the targeted display capabilities (e.g. SDR, HDR, WCG (for Wide Color Gamut)...), depending on the Content Adaptation (CA) method implemented in the IRD. Actually, some decoding devices will only use static metadata, such as the so-called Mastering Display Color Volume Information, to operate a remapping from the HDR content into a SDR image content. Some others will use one or several dynamic metadata to perform a more complex conversion from the HDR color volume into a color volume adapted to the display characteristics.

Moreover, while some decoding devices support several Content Adaptation methods and may choose the most appropriate one depending on the available metadata, some others only support one of them.

As a consequence, if the metadata corresponding to the implemented method, and needed by the decoding device, is not present in the Elementary Streams associated to the image content, then the adaptation of the decoded images to the display features is not possible or may be incorrect.

Moreover, for the time being, and as mentioned above, such metadata are embedded in the Elementary Streams (ES) associated to the encoded image content. Actually, it must be recalled that images are encoded by a codec (as defined for example in MPEG-AVC/H.264 standard or MPEG-HEVC/H. 265 standard) into an Elementary Stream (ES). This Elementary Stream is then encapsulated into a transport layer, in order to be broadcasted or distributed. There are several ways of encapsulating the ES into a transport layer, depending on the targeted application, and the corresponding standard:

MPEG-2 Transport, for broadcasting applications (traditional TV, mobile, network IPTV);

RTP, for video streaming applications on the Internet (Internet Protocol);

MPEG-DASH, which relies on the ISO Base Media File Format standard, and which may be used for conversational services, IPTV, or Video-on-demand applications;

MPEG-2 Systems, for storage and download applications, such as recording the image content on a DVD or a Blu-ray disc.

To access information on the presence of HDR metadata or HDR features encoded into the elementary stream (ES, coded video layer), the decoding device, such as the IRD, must hence first select the right multiplex, next decode the transport layer (TS), and next start decoding the Elementary Streams, without knowing whether the metadata it requires for adapting the decoded content to the display characteristics are, or not, present in the ES. This is both time and power consuming.

Another drawback of this prior art technique lies in the fact that there is no guarantee that, if available, the metadata will be present for the entire sequence or program.

Actually, some video programs are built thanks to splicing techniques, which may consist in cutting some video sequences from a movie for example, and inserting between two cut parts a video sequence corresponding to some advertisement. It is possible that the corresponding stream will comprise metadata in the parts corresponding to some movie scenes, but not in the ad video sequence.

There is no way, for the decoding device, to know whether or not the metadata will be available for the whole duration of the video program or only for parts of it.

There is therefore a need for a technique allowing to overcome at least some of these drawbacks.

3. SUMMARY

The following presents a simplified summary of the present disclosure in order to provide a basic understanding of some of its aspects. This summary is not an extensive overview of the present disclosure. It is not intended to identify key or critical elements of the present disclosure. The following summary merely presents some aspects of the present disclosure in a simplified form as a prelude to the more detailed description provided below.

According to an aspect of the present disclosure, a signal is provided, having at least one type of metadata giving information regarding elementary streams of an encoded video content. Such a signal is formatted to comprise an additional information indicating the presence of at least one particular type of said metadata.

Hence, the present disclosure relies on a novel and inventive approach of the encoding of video signals, which comprises adding an additional information within the signal representative of a video content, in order to inform a receiver on the presence of one or several types of metadata within the signal. It is no longer necessary for a receiver to start decoding the elementary streams in order to determine whether or not some types of metadata are available within theses streams. Moreover, the receiver can directly know whether or not it will be able to adapt the decoded video content to the characteristics of a display to which it is connected, as a function of the available types of metadata, as indicated by this additional information. Such a technique allows saving both time and power consumption, as compared to prior art techniques.

According to another aspect, said additional information also indicates if said at least one particular type of said metadata is present within said signal for a whole duration of said encoded video content. A receiver of said signal can hence directly know whether the metadata needed for adapting the decoded video content to the characteristics of a display to which it is connected will be available for the whole duration of the video sequence or program, or whether it will have to modify or halt such adaptation during the video sequence. According to yet another aspect, said additional information also comprises at least part of said metadata. This is particularly advantageous for static metadata, for which part or full metadata information can be directly available within the additional information, in order to help the receiver choose which content adaptation method to use. According to a further aspect, when said at least one particular type of said metadata belongs to a set of dynamic metadata, said additional information comprises a first refresh information belonging to the group comprising:

a maximal dynamic metadata refresh rate;

a minimal time interval after which said dynamic metadata will be refreshed.

According to a further aspect, when said at least one particular type of said metadata belongs to a set of dynamic metadata, said additional information comprises a second refresh information belonging to the group comprising:

a minimal dynamic metadata refresh rate;

a maximal time interval after which said dynamic metadata will be refreshed.

Information on the metadata refresh rate are useful for the receiver of said signal, in order to know when it will be able to start decoding the video content on the basis of refreshed metadata. This may be interesting for example for a broadcasted video content, when a user decides to switch from a TV channel to another.

According to an aspect of the present disclosure, said additional information is present in a transport stream of said signal.

Hence, the receiver can directly access the information, without having to decode the elementary streams which are encapsulated within said transport stream.

According to a further aspect, said encoded video content is a High Dynamic Range video content, and said metadata are High Dynamic Range metadata.

According to another aspect of the present disclosure, a method for adapting a video content decoded from elementary streams to the characteristics of a display from at least one type of metadata giving information regarding said elementary streams is provided. Such a method comprises:

obtaining an additional information indicating the presence of one particular type of metadata;

determining if said video content decoded from elementary streams is displayable on said display from said additional information and the characteristics of the display; and if said video content decoded from elementary streams is determined as being displayable, selecting a process from said additional information and the characteristics of the display and adapting the video content according to the selected process.

Hence, a receiver of encoded video elementary streams may determine quickly and easily if the received content will be displayable, depending on the characteristics of the display and on the available metadata, and may select an appropriate content adaptation process, for example for remapping an HDR content as a function of the colorimetric features supported by the display.

According to another aspect, said additional information also indicates if said at least one particular type of metadata is present within said signal for a whole duration of said video elementary streams.

According to other of its aspects, the present disclosure relates to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

The present disclosure can be better understood with reference to the following description and drawings, given by way of example and not limiting the scope of protection, and in which.

Similar or same elements are referenced with the same reference numbers.

5. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding/adapting video elementary streams representing a picture or a group of pictures or a whole sequence of pictures.

In the following, the present disclosure will be described in closer detail in relation to a specific embodiment, in which the features of the present disclosure are applied to High Dynamic Range (HDR) Content Adaptation selection process and HDR metadata signaling for Transport-Streams (TS).

As described previously in relation to the known prior art techniques, there is no information, in the transport stream associated to an encoded video content, relating to the presence of HDR metadata, which could be useful for receivers. As a consequence, a receiver/decoder requires parsing a HDR coded stream before making decision on whether the decoded content should be adapted to targeted display characteristics, prior to carriage to the targeted display. Those steps imply resource consumption (decoding portions of Elementary Streams) and look-ahead (inspecting what is in the stream).

The present disclosure consists in specifying an High Dynamic Range (HDR) metadata descriptor that enables knowing accessible HDR specific features through an HDR Elementary Stream (ES). This has importance to adapt or interpret coded video when considering the whole consumer end chain such as receiver, decoder, renderer elements.

For instance, it allows having information about the presence of HDR-to-SDR remapping metadata in the ES, for its full duration. It facilitates and simplifies the retrieval of this information, without requiring to parse the ES itself. In that way, the receiver, for example the IRD, can know in advance whether the stream will be decodable and displayable (possibly taking into account adaptation capability of the receiver) with the display connected to the Integrated Receiver Decoder (IRD) e.g. a STB (Set-Top-Box). Moreover, the receiver can also choose which Content Adaptation model to use, to adapt the decoded video content to the display characteristics.

Figure 1:
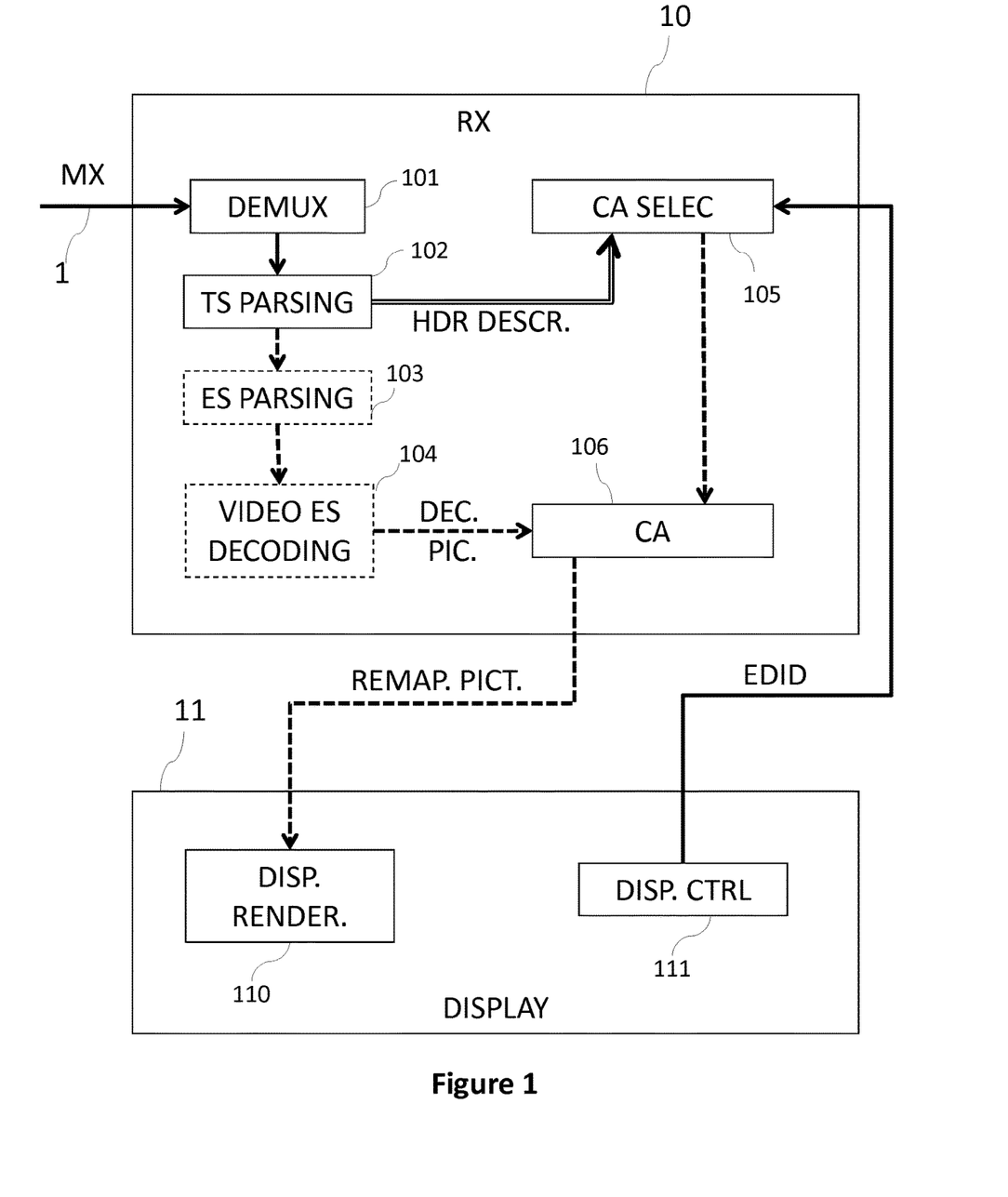
FIG. 1 shows a diagram of the steps of a method for adapting the content of video elementary streams in accordance with an embodiment of the present disclosure.

FIG. 1 illustrates the main steps of a method for adapting a video content decoded from video elementary streams to the characteristics of a display according to an embodiment of the present disclosure.

A receiver RX 10 is connected to a display 11. For example, the receiver RX 10 is an IRD integrated in a TV set 11, or is part of a set-top box, connected through an HDMI link to a display 11.

Figure 4:
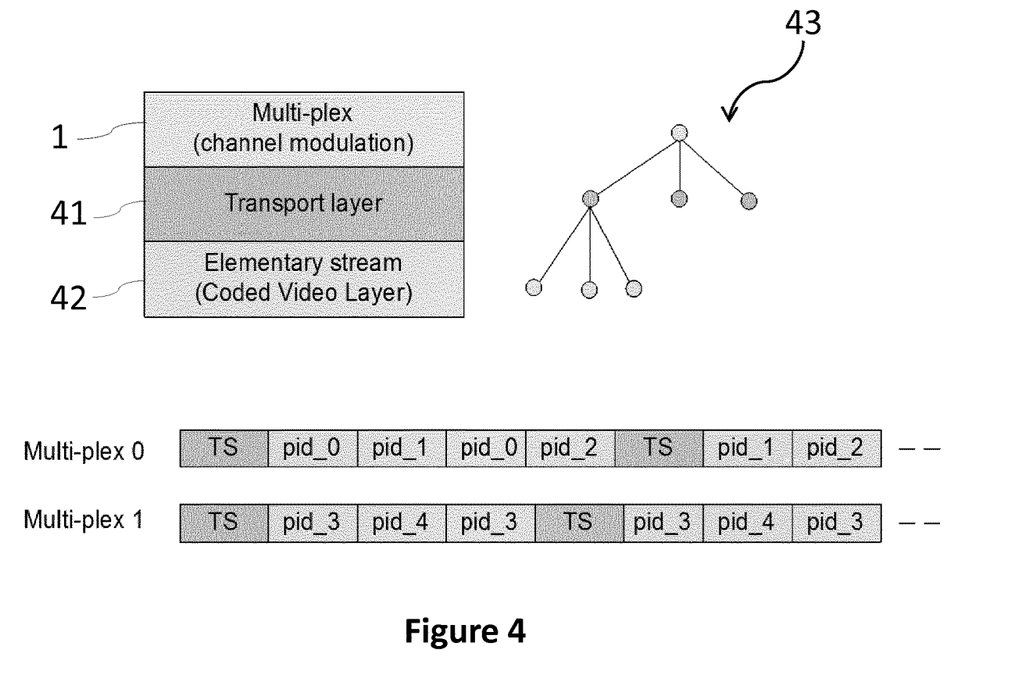
FIG. 4 illustrates the tree structure of a multiplex stream carrying the video elementary streams adapted according to the method of FIG. 1.

The receiver RX 10 receives a multiplex stream MX 1, corresponding to a channel modulation, as illustrated for example by FIG. 4. Such a multiplex stream MX 1 has a tree structure 43, with, at a first level, a transport layer 41, in which are encapsulated Elementary Streams 42, corresponding to the encoded video content. Each Elementary Stream is associated to an identifier, which may for example correspond to a TV channel. Hence, in the example of FIG. 4, a first signal Multiplex 0 carries the Elementary Streams associated to identifiers pid_0, pid_1 and pid_2, while a second signal Multiplex 1 carries the Elementary Streams associated to identifiers pid_3 and pid_4.

The receiver MX 1 demultiplexes the multiplex stream MX 1 at step 101, and then parses the Transport Stream TS 41 at step 102. It hence obtains an additional information HDR DESCR. indicating the presence of one or several particular types of metadata in the transport stream TS 41. Such additional information HDR DESCR. are used, in conjunction with information EDID relating to the characteristics of the display 11, to determine if the decoded pictures from the received video elementary streams are displayable on the display 11, at step CA SELEC 105. The EDID information are received from a display control module DISP.CTRL 111 and comprise notably the display supported formats and the display characteristics. By comparing such EDID information with the metadata available in the multiplex stream MX 1, the receiver RX 1 may decide, at step 105, which Content Adaptation method it should use to adapt the decoded video content to the display characteristics, if the video elementary streams are indeed determined as being displayable.

Once the Content Adaptation process is selected, the receiver RX 10 adapts the video content decoded from the elementary streams according to the selected process at step CA 106. The video content decoded from the elementary streams DEC. PIC. are obtained after a step 104 of Video ES Decoding, resulting from a step 103 in which the Elementary Streams 42 encapsulated in the Transport Stream 41 have been parsed. The adapted, or remapped pictures REMAP. PICT. are sent to the display 11 in order to be rendered at step 110 DISP. RENDER.

Thus, the HDR_descriptor is used by the IRD for:

Determination by IRD whether the HDR video is (correctly) displayable on the connected display thanks to EDID information (display supported formats) and HDR_descriptor information.

If HDR content is displayable, selection of the appropriate Content Adaptation method given the display capabilities.

It must be noted that only the TS layer 41 is parsed, not the ES 42.

According to an embodiment of the present disclosure, addition of a descriptor in the TS (Transport Stream) layer 41 signals the presence of one particular type of HDR metadata or feature. It may also signal if this information is present for the whole program or sequence duration.

An example of syntax of such a descriptor HDR DESCR. (also called additional information in the present document), which is carried by a signal F, is presented in Table 1.

TABLE 1

Example of HDR metadata descriptor.

| Syntax | No. Of bits | Mnemonic |
|---|---|---|
| HEVC_HDR_descriptor( ) { | | |
|    mastering_display_colour_volume_info_present_flag | 1 | bslbf |
|    colour_remapping_info_present_flag | 1 | bslbf |
|    content_light_level_info_present_flag | 1 | bslbf |
|    hdr_compatibility_info_flag | 1 | bslbf |
|    reserved | 4 | bslbf |
|    ... | | |
| } | | |

As may be observed in Table 1, the descriptor comprises flags indicating the presence of four different types of metadata, namely:

Color Remapping Information (CRI);
Mastering Display Color Volume Information;
Content Light Level Information;
HDR Compatibility.

When the value of the flag is set at "1", it indicates that the corresponding type of metadata is present for the whole duration of the encoded video stream, or the whole program.

According to an embodiment, part or full static metadata information could be available in the descriptor as given in example with the "*Mastering Display Colour Volume information*" in Table 2.

TABLE 2

Example of HDR metadata descriptor.

| Syntax | No. Of bits | Mnemonic |
|---|---|---|
| HEVC_HDR_descriptor( ) { | | |
|    mastering_display_colour_volume_info_present_flag | 1 | bslbf |
|    colour_remapping_info_present_flag | 1 | bslbf |
|    content_light_level_info_present_flag | 1 | bslbf |
|    hdr_compatibility_info_flag | 1 | bslbf |
|    reserved | 4 | bslbf |
|    if (mastering_display_colour_volume_info_present_flag ) | | |
|    { | 16 | bslbf |
|       for( c = 0; c < 3; c++ ) { | 16 | bslbf |
|          display_primaries_x[ c ] | | |
|          display_primaries_y[ c ] | | |
|       } | | |
|    white_point_x | 16 | bslbf |
|    white_point_y | 16 | bslbf |
|    max_display_mastering_luminance | 32 | bslbf |
|    min_display_mastering_luminance | 32 | bslbf |
| } | | |

The features of the corresponding metadata, namely the associated colorimetric primaries, the white points and the minimum and maximum display mastering luminance are directly available in the descriptor HDR DESCR. in the transport stream 41.

According to an embodiment, the maximal dynamic metadata refresh rate or minimal period is signaled. It indicates the minimum interval the dynamic metadata are being refreshed (example in Table 3). This information may be expressed in number of reference clock rate number or number of ticks (ex: 90 KHz).

TABLE 3

Example of HDR metadata descriptor with dynamic metadata refresh rate.

| Syntax | No. Of bits | Mnemonic |
|---|---|---|
| HEVC_HDR_descriptor( ) { | | |
|    mastering_display_colour_volume_info_present_flag | 1 | bslbf |
|    colour_remapping_info_present_flag | 1 | bslbf |
|    content_light_level_info_present_flag | 1 | bslbf |
|    hdr_compatibility_info_flag | 1 | bslbf |

TABLE 3-continued

Example of HDR metadata descriptor with dynamic metadata refresh rate.

| Syntax | No. Of bits | Mnemonic |
|---|---|---|
|     reserved | 4 | bslbf |
|     if ( colour_remapping_info_present_flag ) { | | |
|         max_colour_remapping_info_refresh_rate | 32 | bslbf |
|     } | | |
| } | | |

According to an embodiment, the minimal dynamic metadata refresh rate or maximal period is signaled. It indicates the maximum interval the dynamic metadata are being refreshed (example in Table 4). This information may be expressed in number of reference clock rate number or number of ticks (ex: 90 KHz) or number of ES video frame rate.

TABLE 4

Example of HDR metadata descriptor with dynamic metadata refresh rate.

| Syntax | No. Of bits | Mnemonic |
|---|---|---|
| HEVC_HDR_descriptor( ) { | | |
|     mastering_display_colour_volume_info_present_flag | 1 | bslbf |
|     colour_remapping_info_present_flag | 1 | bslbf |
|     content_light_level_info_present_flag | 1 | bslbf |
|     hdr_compatibility_info_flag | 1 | bslbf |
|     reserved | 4 | bslbf |
|     if ( colour_remapping_info_present_flag ) { | | |
|         min_colour_remapping_info_refresh_rate | 32 | bslbf |
|     } | | |
| } | | |

According to an embodiment, the remapped (colour_remapping_info) signal characteristic is signaled. It will be used by the IRD to know (choose) which format to be sent to the display, and/or to know if it is supported by the display.

TABLE 5

Example of HDR metadata descriptor with dynamic metadata refresh rate.

| Syntax | No. Of bits | Mnemonic |
|---|---|---|
| HEVC_HDR_descriptor( ) { | | |
|     mastering_display_colour_volume_info_present_flag | 1 | bslbf |
|     colour_remapping_info_present_flag | 1 | bslbf |
|     content_light_level_info_present_flag | 1 | bslbf |
|     hdr_compatibility_info_flag | 1 | bslbf |
|     reserved | 4 | bslbf |
|     if ( colour_remapping_info_present_flag \|\| hdr_compatibility_info_flag ) { | | |
|         colour_target_primaries | 8 | bslbf |
|         colour_target_transfer_function | 8 | bslbf |
|         colour_target_matrix_coefficients | 8 | bslbf |
|     } | | |
| } | | |

A variant to the example of table 5 is provided below:

| Syntax | No. Of bits | Mnemonic |
|---|---|---|
| HEVC_HDR_descriptor( ) { | | |
|     mastering_display_colour_volume_info_present_flag | 1 | bslbf |
|     colour_remapping_info_present_flag | 1 | bslbf |
|     content_light_level_info_present_flag | 1 | bslbf |
|     hdr_compatibility_info_flag | 1 | bslbf |

-continued

| Syntax | No. Of bits | Mnemonic |
|---|---|---|
| transfer_function_info_flag | 1 | bslbf |
| color_info_present_flag | 1 | |
| reserved | 2 | bslbf |
| if ( transfer_function_info_flag ) { | | bslbf |
|     colour_target_transfer_function | 8 | bslbf |
| } | 8 | |
| if ( color_info_present_flag ) { | 8 | |
|     colour_target_primaries | | |
|     colour_target_matrix_coefficients | | |
| } | | |
| } | | |

The present disclosure thus provides several advantages over prior art techniques:
- The IRD RX 10 has access to the information of the presence of some particular type of HDR static and dynamic metadata at a high level (TS 41).
- The IRD RX 10 has knowledge whether the metadata will be present for all the duration of the program/sequence.
- The IRD RX 10 doesn't need to parse the ES (42) anymore, but only the TS (41), to know if it can display the HDR pictures correctly.

In that way, the IRD RX 10 can give this information to the User Interface (or to the content adaptation selection module) to warn about the possibly full support (or not) of the HDR rendering, depending on its implemented post-processing (ex: color volume mapping) and depending on the connected display characteristics via ED ID.

Additionally, it can select the appropriate (among the ones implemented in the IRD RX 10) content adaptation model.

On FIG. 1, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array », «Very Large Scale Integration », or from several integrated electronic components embedded in a device or from a blend of hardware and software components.

Figure 2:
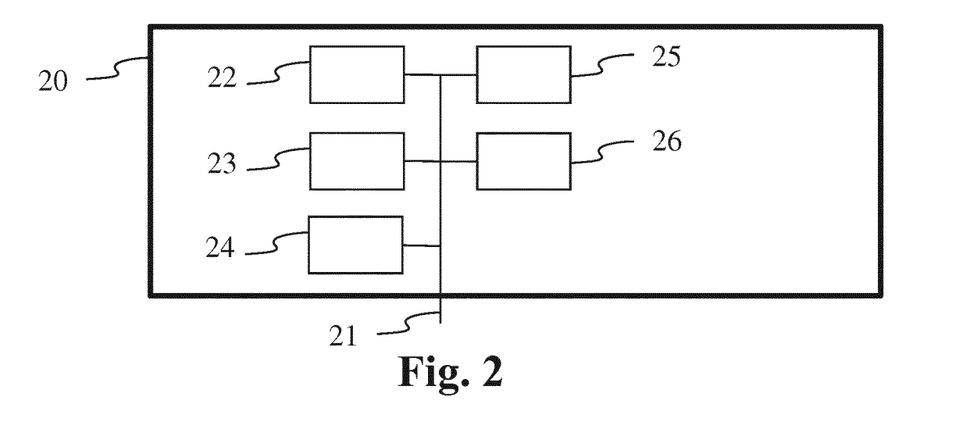
FIG. 2 shows an example of an architecture of a device in accordance with an embodiment of the present disclosure.

FIG. 2 represents an exemplary architecture of a device 20 which may be configured to implement a method described in relation with FIG. 1.

Device 20 comprises following elements that are linked together by a data and address bus 21:
- a microprocessor 22 (or CPU), which is, for example, a DSP (or Digital Signal Processor);
- a ROM (or Read Only Memory) 23;
- a RAM (or Random Access Memory) 24;
- an I/O interface 25 for reception of data to transmit, from an application; and
- a battery 26.

In accordance with an example, the battery 26 is external to the device. In each of mentioned memory, the word «register» used in the specification can correspond to area of small capacity (some bits) or to very large area (e.g. a whole program or large amount of received or decoded data). The ROM 23 comprises at least a program and parameters. The ROM 23 may store algorithms and instructions to perform techniques in accordance with present principles. When switched on, the CPU 22 uploads the program in the RAM and executes the corresponding instructions.

RAM 24 comprises, in a register, the program executed by the CPU 22 and uploaded after switch on of the device 20, input data in a register, intermediate data in different states of the method in a register, and other variables used for the execution of the method in a register. The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of device, the multiplex stream MX 1 (FIG. 1) is obtained from a source. For example, the source belongs to a set comprising:
- a local memory (23 or 24), e.g. a video memory or a RAM (or Random Access Memory), a flash memory, a ROM (or Read Only Memory), a hard disk;
- a storage interface (25), e.g. an interface with a mass storage, a RAM, a flash memory, a ROM, an optical disc or a magnetic support;
- a communication interface (25), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the device, the remapped picture REMAP.PICT. (FIG. 1) is sent to a destination; specifically, the destination belongs to a set comprising:
- a local memory (23 or 24), e.g. a video memory or a RAM, a flash memory, a hard disk;
- a storage interface (25), e.g. an interface with a mass storage, a RAM, a flash memory, a ROM, an optical disc or a magnetic support;

a communication interface (25), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi ® or a Bluetooth ® interface);

a display 11; and an IRD 10.

In accordance with examples of the device, the signal F carrying the descriptor HDR DESCR. is obtained from a source. Exemplarily, the signal F is read from a local memory, e.g. a video memory (24), a RAM (24), a ROM (23), a flash memory (23) or a hard disk (23). In a variant, the bitstream is received from a storage interface (25), e.g. an interface with a mass storage, a RAM, a ROM, a flash memory, an optical disc or a magnetic support and/or received from a communication interface (25), e.g. an interface to a point to point link, a bus, a point to multipoint link or a broadcast network.

In accordance with examples, the device 20 being configured to implement a method described in relation with FIG. 1, belongs to a set comprising:

a mobile device;
a communication device;
a game device;
a tablet (or tablet computer);
a laptop;
a still picture camera;
a video camera;
an encoding chip;
a still picture server; and
a video server (e.g. a broadcast server, a video-on-demand server or a web server).

Figure 3:
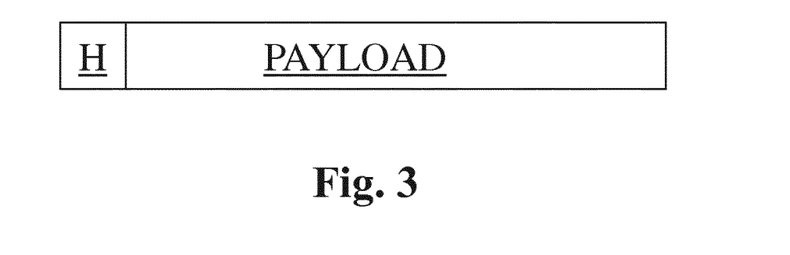
FIG. 3 shows the syntax of a signal in accordance with an embodiment of the present disclosure.

FIG. 3 shows an example of the syntax of such a signal F when a packet-based transmission protocol is used. Each transmitted packet P comprises a header H and a payload PAYLOAD. A bit of the header H, for example, represents an additional information indicating the presence of one particular type of said metadata and if this additional information is present for the whole duration of the video streams (payload PAYLOAD).

More precisely, according to an embodiment, and as described in example of Table 1, some bits may be reserved and form a HDR metadata descriptor in the transport stream TS packet of the multiplex of FIG. 4 (Multi-plex 0 or Multi-plex 1). These bits are flags indicating the presence of different types of HDR metadata, and indicating if they are present for the whole duration of the elementary streams 42.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for adapting a video content to characteristics of a display, the method comprising:

receiving video data comprising a transport layer and at least one encapsulated video elementary stream;

obtaining, from the transport layer, additional information descriptive of High Dynamic Range (HDR) properties of the at least one encapsulated video elementary stream, wherein the additional information comprises parameters descriptive of color primaries, transfer characteristics, and matrix coefficients;

obtaining display description data comprising the characteristics of the display, wherein the characteristics comprise one or more formats supported by the display;

based on the additional information and the display description data, determining whether the video content is displayable on the display; and in response to determining that the video content is displayable on the display:
- obtaining the video content by decoding the at least one encapsulated elementary stream; and
- adapting the decoded video content using a content adaptation process selected based on the additional information and the display description data, wherein the content adaptation process comprises color remapping based on dynamic metadata according to a refresh rate;

wherein the additional information further comprises information descriptive of the refresh rate of the dynamic metadata.

2. The method of claim 1, wherein the additional information is obtainable without decoding the video content from an elementary stream that is encapsulated in the transport stream.

3. The method of claim 1, wherein the video content is encoded in an elementary stream.

4. The method of claim 1, wherein the additional information is present for a whole duration of the video content.

5. The method of claim 1, wherein the additional information indicates that the encapsulated video elementary stream includes dynamic HDR m etadata.

6. The method of claim 5, wherein the additional information comprises a first refresh information belonging to the group comprising: a maximal dynamic metadata refresh rate; a minimal time interval after which the dynamic metadata will be refreshed.

7. The method of claim 5, wherein the additional information comprises a second refresh information belonging to the group comprising: a minimal dynamic metadata refresh rate; a maximal time interval after which the dynamic metadata will be refreshed.

8. A device for adapting a video content to characteristics of a display, wherein the device comprises a processor configured to:

receive video data comprising a transport layer and at least one encapsulated video elementary stream;

obtain, from the transport layer, additional information descriptive of High Dynamic Range (HDR) properties of the at least one encapsulated video elementary stream, the additional information comprising parameters descriptive of color primaries, transfer characteristics, and matrix coefficients;

obtain display description data comprising the characteristics of the display, wherein the characteristics comprise one or more formats supported by the display;

based on the additional information and the display description data, determine whether the video content is displayable on the display; and in response to determining that the video content is displayable on the display:
- obtain the video content by decoding the at least one encapsulated elementary stream; and
- adapt the decoded video content using a content adaptation process selected based on the additional information and the display description data, wherein the content adaptation process comprises color remapping based on dynamic metadata according to a refresh rate;

wherein the additional information further comprises information descriptive of the refresh rate of the dynamic metadata.

9. The device of claim 8, wherein the determining occurs before starting to decode the video content.

10. The device of claim 8, wherein the additional information is present for a whole duration of the video content.

11. The device of claim 8, wherein the additional information comprises a first refresh information belonging to the group comprising: a maximal dynamic metadata refresh rate; and a minimal time interval after which the dynamic metadata will be refreshed.

12. The device of claim 8, wherein the additional information comprises a second refresh information belonging to the group comprising: a minimal dynamic metadata refresh rate; and a maximal time interval after which the dynamic metadata will be refreshed.

13. A non-transitory storage medium carrying instructions of program code for executing a method for adapting a video content to characteristics of a display, wherein the method comprises:

receiving video data comprising a transport layer and at least one encapsulated video elementary stream;
obtaining, from the transport layer, additional information descriptive of High Dynamic Range (HDR) properties of the at least one encapsulated video elementary stream, the additional information comprising parameters descriptive of color primaries, transfer characteristics, and matrix coefficients;

obtaining display description data comprising the characteristics of the display, wherein the characteristics comprise one or more formats supported by the display;
based on the additional information and the display description data, determining whether the video content is displayable on the display; and
in response to determining that the video content is displayable on the display:

obtaining the video content by decoding the at least one encapsulated elementary stream; and adapting the decoded video content using a content adaptation process selected based on the additional information and the display description data, wherein the content adaptation process comprises color remapping based on dynamic metadata according to a refresh rate;

wherein the additional information further comprises information descriptive of the refresh rate of the dynamic metadata.

14. The non-transitory storage medium of claim 13, wherein the additional information comprises a first refresh information belonging to the group comprising: a maximal dynamic metadata refresh rate; a minimal time interval after which the dynamic metadata will be refreshed.

15. The non-transitory storage medium of claim 13, wherein the additional information comprises a second refresh information belonging to the group comprising: a minimal dynamic metadata refresh rate; a maximal time interval after which the dynamic metadata will be refreshed.

* * * * *